(12) United States Patent
Maruyama

(10) Patent No.: US 6,729,694 B2
(45) Date of Patent: May 4, 2004

(54) BALANCE WEIGHT FOR A WHEEL OF A TWO-WHEEL VEHICLE

(75) Inventor: Saburo Maruyama, Ayase (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 23 days.

(21) Appl. No.: 10/262,866

(22) Filed: Oct. 3, 2002

(65) Prior Publication Data

US 2003/0067208 A1 Apr. 10, 2003

(30) Foreign Application Priority Data

Oct. 4, 2001 (JP) ........................................ 2001-308680

(51) Int. Cl.[7] .............................. B60B 1/00; B60B 27/00
(52) U.S. Cl. ...................................................... 301/5.21
(58) Field of Search ................................ 301/5.21, 5.22; 74/573 R

(56) References Cited

U.S. PATENT DOCUMENTS

| | | | |
|---|---|---|---|
| 1,889,577 A | * 11/1932 | Tibbetts | 301/5.21 |
| 2,433,762 A | 12/1947 | Kalajian | |
| 5,350,220 A | * 9/1994 | Atwell, Jr. | 301/5.21 |
| 5,564,792 A | * 10/1996 | Archibald | 301/5.21 |
| 6,238,005 B1 | * 5/2001 | Sugayauchi et al. | 301/5.21 |
| 6,250,721 B1 | * 6/2001 | Oba et al. | 301/5.21 |
| 6,364,422 B1 | * 4/2002 | Sakaki et al. | 301/5.21 |
| 6,488,341 B2 | * 12/2002 | Maruyama et al. | 301/5.21 |

FOREIGN PATENT DOCUMENTS

| | | |
|---|---|---|
| FR | 1 114 880 | 4/1956 |
| JP | 0 994 274 A2 | 4/2000 |
| JP | 2001-221289 | 8/2001 |
| JP | 2001-280423 | 10/2001 |
| JP | 2002-257197 | 9/2002 |

* cited by examiner

*Primary Examiner*—S. Joseph Morano
*Assistant Examiner*—Jason R. Bellinger
(74) *Attorney, Agent, or Firm*—Pillsbury Winthrop LLP

(57) ABSTRACT

A balance weight for a wheel of a two-wheel vehicle includes a weight body made from metal other than lead and a clip made from spring steel. The weight body includes a U-shaped transverse cross-section and a groove for mounting the clip therein. The weight body further includes a groove bottom wall and a pair of groove side walls connected to opposite width ends of the groove bottom wall. The clip includes a bottom portion and a pair of arms connected to opposite width ends of the bottom portion of the clip. The clip is mounted to the groove bottom wall of the weight body with the bottom portion of the clip contacting closely to the groove bottom wall of the weight body. The clip and the weight body are coupled to each other by a mechanical coupling. The coupling may be replaced by a local welding.

10 Claims, 3 Drawing Sheets

BALANCE WEIGHT FOR A WHEEL OF A TWO-WHEEL VEHICLE

This application is based on and claims priority from Japanese Patent Application No. 2001-308680 filed on Oct. 4, 2001, the content of which is incorporated herein by reference.

BACKGROUND OF THE INVENTION

1. Field of the Invention

The present invention relates to a balance weight used for a wheel of a two-wheel vehicle.

2. Description of the Related Art

Usually, a balance weight is mounted on a wheel of a two-wheel vehicle for removing a rotational imbalance of the wheel.

A conventional balance weight for a wheel of a two-wheel vehicle includes a weight body made from lead and made in the form of a bar and a clip having one end embedded in the weight body. The balance weight is fixed to the wheel by attaching the clip to a rib of a wheel rim of the wheel.

The weight body is a cast of lead. The clip is made from spring-steel having elasticity. The clip is fixed to the weight body by embedding one end of the clip in the weight body during casting of the weight body. In order to provide the clip with a spring-elasticity, the clip is heat-treated before the one end of the clip is embedded in the weight body. Since the melting point of lead is lower than the heat-treatment temperature of the clip, the spring elasticity of the clip is not lost during casting of the weight body with the one end of the clip in the weight body.

However, the conventional balance weight for a wheel of a two-wheel vehicle has an environmental problem because the weight body is made from lead.

Replacement to metal other than lead could be conceived. For example, iron and steel are safe from the viewpoint of the environment and are relatively cheap, and have a relatively high specific density.

However, use of those metals is accompanied by a problem that the spring-elasticity of the clip is lowered, because the melting points of the clip and the weight body of iron or steel are close to each other and an alloy-phase and a heat-affected zone are formed in the clip during casting of the weight body with one end of the clip in the weight body. If the heat-treatment of the clip is attempted to be conducted after the casting of the weight body, the heat-treatment conditions of the clip are very difficult to be selected and, as a result, the heat-treatment of the clip is accompanied by an increase in cost, because the clip and the weight body are integral with each other.

SUMMARY OF THE INVENTION

An object of the present invention is to provide a balance weight for a wheel of a two-wheel vehicle capable of changing a material of a weight body to metal other than lead and capable of maintaining a spring-elasticity of a clip as high as that of a clip of a conventional balance weight with a lead weight body.

A balance weight for a wheel of a two-wheel vehicle according to the present invention includes a weight body made from metal other than lead and a clip made from spring-steel.

The weight body has a transverse cross-section of the form of U-letter and a groove for mounting the clip therein. The weight body includes a groove bottom wall and a pair of groove side walls connected to opposite width ends of the groove bottom wall.

The clip includes a bottom portion and a pair of arms connected to opposite width ends of the bottom portion of the clip. Each of the pair of arms includes a first, inclining portion extending toward an opposite arm of the pair of arms and in a direction away from the bottom portion of the clip, a second, rib-holding portion connected to the first portion and located closest to the opposite arm of the pair of arms, and a third, guide portion connected to the second portion and extending in a direction away from the opposite arm of the pair of arms and in the direction away from the bottom portion of the clip.

The clip is mounted to the groove bottom wall of the weight body with the bottom portion of the clip contacting closely to the groove bottom wall of the weight body, and the clip is fixed to the groove bottom wall of the weight body at the bottom portion of the clip.

The weight body is made from iron, for example, cast iron and cast steel.

The weight body may have a protrusion for coupling the clip, at the groove bottom wall of the weight body, and the clip may have an aperture formed in the bottom portion of the clip. The clip and the weight body may be coupled to each other by inserting the protrusion of the weight body into the aperture of the clip and then caulking the protrusion.

The coupling may be achieved by spot-welding or projection-welding.

The balance weight is mounted to a wheel rim of the wheel of a two-wheel vehicle by inserting a rib of the wheel rim into the clip of the balance weight. The pair of arms of the clip hold the rib between them due to the spring-elasticity of the clip and is fixed to the rib. Since the balance weight can be mounted only by inserting the rib into the clip, the mounting of the balance weight to the wheel is easy.

Since the weight body is made from metal other than lead, the environmental problem existing in the conventional balance weight having a lead weight body is removed. In the case where the weight body is made from iron, for example, ductile cast iron or cast steel, a sufficient amount of weight is assured even by a weight body of a relatively small size, so that a balance weight of a low cost is provided.

In the case where the weight body is made from ductile cast iron or cast steel, the weight body can be coupled with the clip by various methods, such as caulking, spot-welding, and projection-welding. Therefore, the spring-elasticity of the clip is not lowered.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

A balance weight for a wheel of a two-wheel vehicle according to embodiments of the present invention will be explained with reference to FIGS. 1–7.

First, structural portions common to or similar to all of embodiments of the present invention will be explained.

A total weight of a balance weight 1 for a wheel of a two-wheel vehicle can be determined by conducting a balancing test of the wheel of a two-wheel vehicle mounted with a tire. A length L in an axial direction of the balance weight 1 (i.e., a longitudinal direction thereof, which is the same as a circumferential direction of a wheel rim) and a width W of the balance weight 1 are determined depending on the total weight of the balance weight 1.

Figure 6:
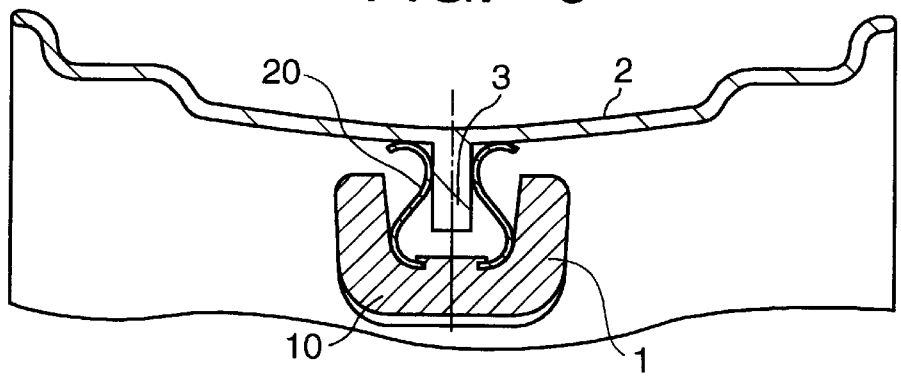
FIG. 6 is a cross-sectional view of a wheel rim mounted with the balance weight of FIG. 1.
Figure 7:
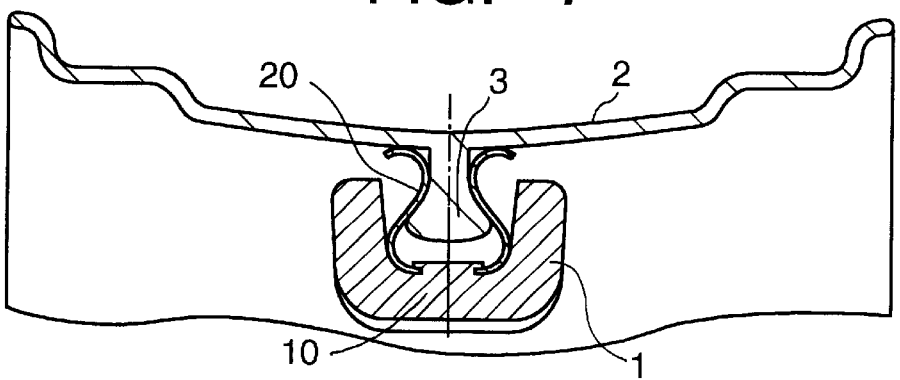
FIG. 7 is a cross-sectional view of a wheel rim, having a rib configuration different from that of FIG. 6, to which the balance weight of FIG. 1 is mounted.

As illustrated in FIGS. 6 and 7, the balance weight 1 is mounted to a rib 3 which protrudes inwardly in a radial direction of a wheel rim 2. The rib 3 extends in a circumferential direction of the wheel rim 2 at a width center of the wheel rim 2 so as to reinforce the wheel rim 2.

The balance weight 1, as illustrated in FIGS. 1–5, includes a weight body 10 and a clip 20.

The weight body 10 is made from metal other than lead having a relative high specific density, for example, iron and copper. Among iron and copper, the weight body 16 is preferably made from cast steel, for example, JIS•FCD400, or ductile cast iron, where the weight body 10 is manufactured by casting. However, the material is not limited to cast steel, but may be forged steel. Accordingly, the balance weight 1 according to the present invention contains no lead.

The weight body 10 includes a groove bottom wall 11 and a pair of groove side walls 12 connected to opposite width ends of the groove bottom wall 11. The weight body 10 includes a groove 13 for mounting the clip 20 therein. The groove 13 extends over an entire length of the weight body 10 in a longitudinal direction thereof and has a transverse cross-section of the form of a U-letter.

The clip 20 is made from spring-steel and is preferably made from, for example, a material equivalent to JIS•SK5. The clip 20 is manufactured in the form of, for example, a spring plate that is provided with spring-elasticity, and has a thickness of 0.4 mm and a hardness of HRC 42–60 at a surface of the spring plate after heat-treated.

The clip 20 includes a bottom portion 21 and a pair of arms 22 connected to opposite width ends of the bottom portion 21. Each of the pair of arms 22 includes (a) a first, inclining portion 23 extending toward an opposite arm of the pair of arms 22 and in a direction away from the bottom portion 21 of the clip 20, (b) a second, rib-holding portion 24 connected to the first portion 23 and located closest to the opposite arm of the pair of arms 22, and (c) a third, guide portion 25 connected to the second portion 24 and extending in a direction away from the opposite arm of the pair of arms 22 and in the direction away from the clip bottom portion 21.

The clip 20 is mounted to the weight body 10 at the groove 13 of the weight body 10. When mounted, the third, guide portion 25 is located outside the groove 13 of the weight body 10.

The clip 20 is mounted to the groove bottom wall 11 of the weight body 10 with the bottom portion 21 of the clip 20 contacting closely to the groove bottom wall 11 of the weight body 10, and is fixed to the groove bottom wall 11 at the bottom portion 21 of the clip 20. A connecting portion between the bottom portion 21 and the arm 22 includes a curved portion 26. The curved portion 26 contacts closely to a curved inner surface 14 of a connecting portion between the groove bottom wall 11 and a corresponding one of the pair of the groove side walls 12 of the weight body 10, and is also held by the curved inner surface 14.

Before the balance weight 1 is mounted to the rib 3 of the wheel rim 2, the distance between a pair of the rib-holding portions 24 of the clip 20 is smaller than the thickness of the rib 3. When the balance weight 1 is mounted to the rib 3, the pair of rib-holding portions 24 of the clip 20 hold the rib 3 therebetween with the spring-elasticity thereof.

The groove bottom wall 11 of the weight body 10 has an outside surface 15, opposite to the groove 13, which is curved in a longitudinal direction of the weight body 10. The curved configuration includes the shape of an arc coaxial with the wheel, which makes the balance weight 1 fit to the wheel rim 2 when mounted to the rib 3.

At each of opposite longitudinal ends 16 of the weight body 10, an inclination angle $\alpha$ is provided such that a distance between the opposite longitudinal ends 16 increases in a radially outward direction of the wheel. The inclination angle $\alpha$ facilitates a die to release from the weight body 10 when the weight body 10 is cast or forged. The inclination angle $\alpha$ is preferably 2–3°.

Next, effects common to or similar to all of the embodiments of the present invention will be explained.

With the balance weight 1 according to the present invention, the environmental problem existing in the conventional balance weight is removed, since the weight body 10 and the clip 20 are made from metals other than lead, for example, iron and steel.

The balance weight 1 is mounted to the rib 3 of the wheel rim 2 of a two-wheel vehicle by inserting the rib 3 into the clip 20 of the balance weight 2. Since the pair of guide portions 25 are provided in the opposite end portions of the clip 20 and the pair of guide portions 25 are inclined in a direction away from each other, the rib 3 can be smoothly inserted into the clip 20.

Further, since the distance between the pair of rib-holding portions 24 of the clip 20 is smaller than the thickness of the rib 3, and since when the rib 3 is inserted between the rib-holding portions 24, the distance between the rib-holding portions 24 is enlarged to the thickness of the rib 3, the rib-holding portions 24 can hold the rib 3 therebetween with spring-elasticity. As a result, the balance weight 1 can be mounted to the wheel rim 2 of the wheel of a two-wheel vehicle only by inserting the rib 3 into the clip 20, thereby making the mounting of the balance weight 1 to the wheel easy. Further, after the balance weight 1 is mounted to the wheel, the balance weight 1 does not drop from the rib 3, since the clip 20 holds the rib 3 with the spring-elasticity.

As illustrated in FIG. 7, preferably, the rib 3 has such a cross-section that a rib end portion, that is, an innermost portion of the rib 3 in a radial direction of the wheel, is formed wider than a remaining portion of the rib 3, which makes coupling of the balance weight 1 to the rib 3 more reliable. As illustrated in FIG. 6, the rib 3 may have a cross-sectional shape having a constant thickness. In the case of the constant thickness, since a centrifugal force acts on the balance weight 1 during rotation of the wheel, the balance weight 1 is pushed toward the wheel rim 2 and is prevented from dropping from the rib 3.

Next, portions unique to each embodiment of the present invention will be explained.

Figure 1:
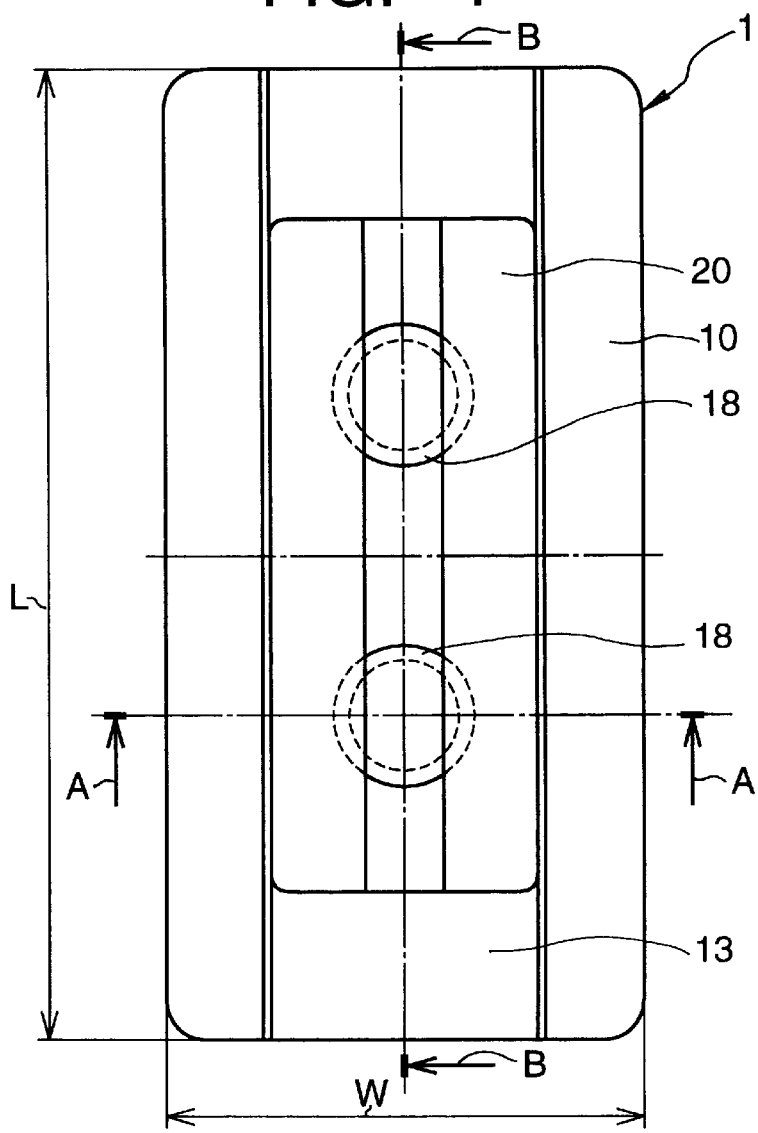
FIG. 1 is a plan view of a balance weight for a wheel of a two-wheel vehicle according to an embodiment of the present invention.
Figure 2:
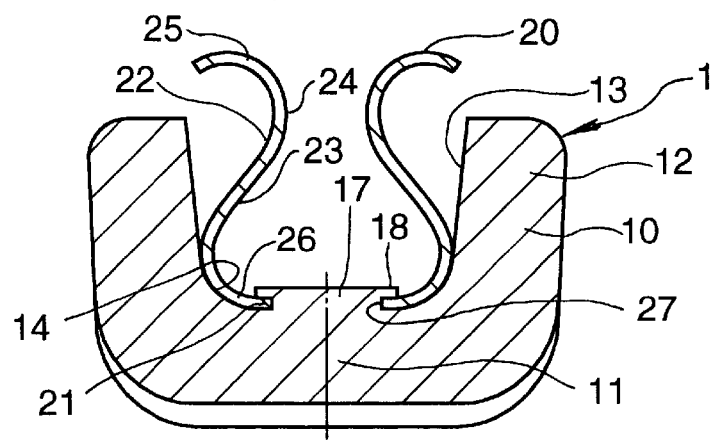
FIG. 2 is a cross-sectional view taken on line A—A of FIG. 1.
Figure 3:
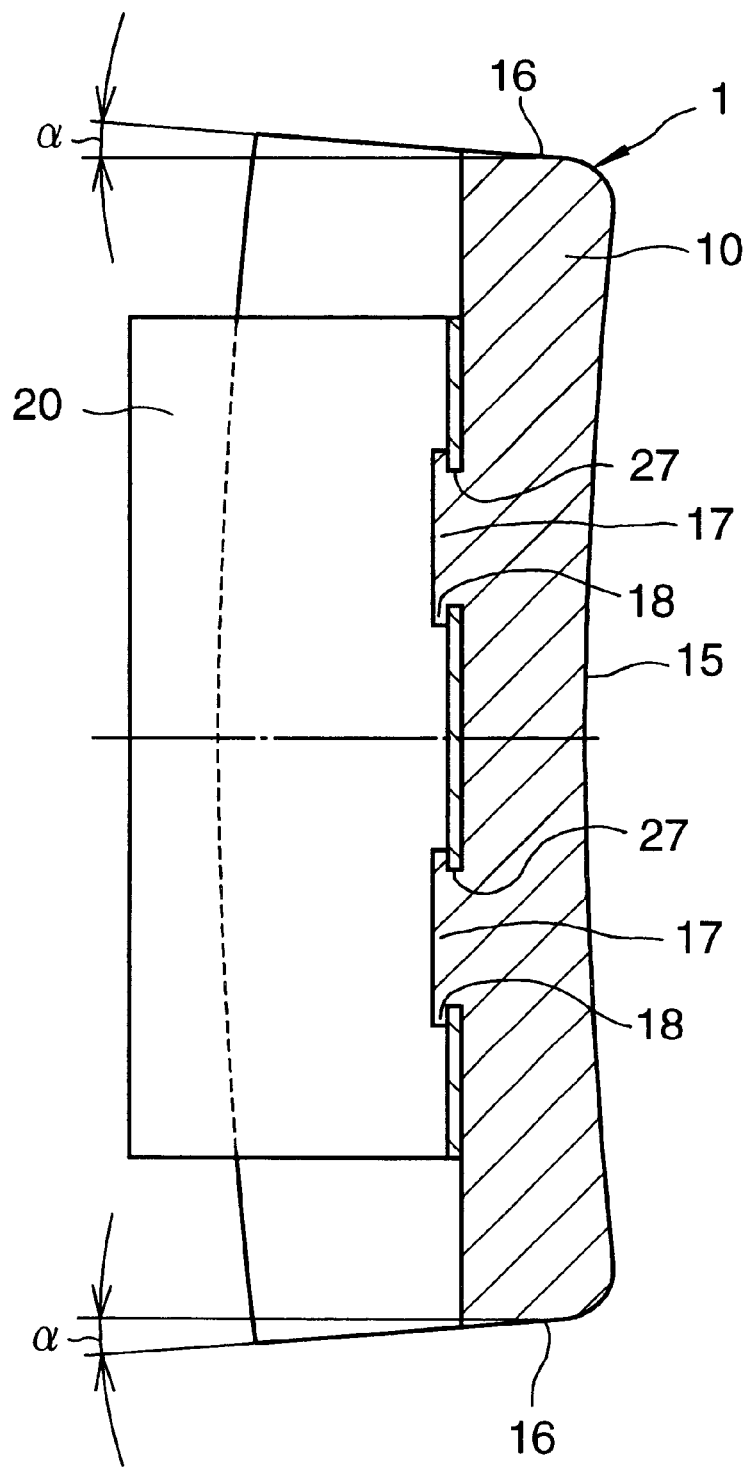
FIG. 3 is a cross-sectional view taken on line B—B of FIG. 1.
Figure 4:
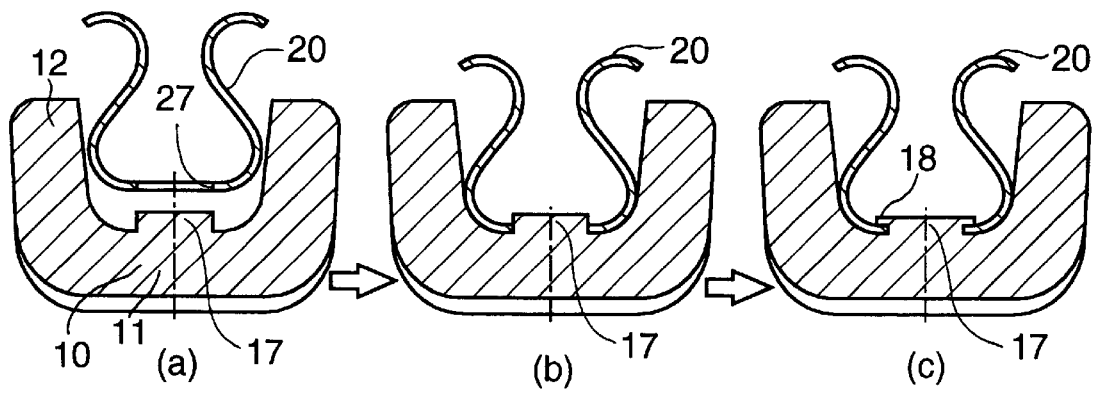
FIG. 4 is a cross-sectional view illustrating an example of a coupling structure of a weight body and a clip according to a first embodiment of the present invention, shown in order of manufacturing processes.

With a first embodiment of the present invention, as illustrated in FIGS. 1–4 (process (a) in FIG. 4), the weight body 10 includes at least one protrusion 17 for coupling the clip 20 at the groove bottom wall 11. The height of the protrusion 17 is greater than the thickness of the clip 20.

At the bottom portion 21 of the clip 20, at least one aperture 27 is formed at a location corresponding to the protrusion 17 of the weight body 10. The diameter of the aperture 27 is equal to or slightly greater than that of the protrusion 17.

The clip 20 is coupled to the weight body 10, as follows:

As illustrated in process (a) of FIG. 4, the clip 20 is lined-up with the weight body 10 such that the aperture 27 of the clip 20 is centered on the protrusion 17 of the weight body 10.

As illustrated in process (b) of FIG. 4, the protrusion 17 of the weight body 10 is then inserted into the aperture 27 of the clip 20, and the bottom portion 21 of the clip 20 is contacted closely to the groove bottom wall 12 of the weight body 10.

As illustrated in process (c) of FIG. 4, the protrusion 17 of the weight body 10 is then caulked so that a caulked portion 18 has a diameter greater than that of the aperture 27, thereby making the clip 20 undetachably coupled to the weight body 10.

Since the clip 20 and the weight body 10 are coupled to each other by caulking, a heat-affected zone is not caused in the clip 20 unlike a coupling by embedding, so that the spring-elasticity of the clip 20 is not lowered due to heat.

Figure 5:
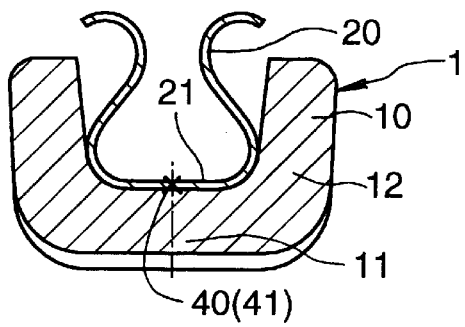
FIG. 5 is a cross-sectional view illustrating a coupling structure of a weight body and a clip according to a second embodiment of the present invention.

With a second embodiment of the present invention, as illustrated in FIG. 5, when the bottom portion 21 of the clip 20 is positioned to contact closely with the groove bottom wall 11 of the weight body 10, the bottom portion 21 and the groove bottom wall 11 are fixed to each other by spot-welding 40.

Alternatively, a projection may be formed at the groove bottom wall 11 of the weight body 10, then the bottom portion 21 of the clip 20 is pushed to the projection. Thereafter, the groove bottom wall 11 of the weight body 10 and the bottom portion 21 of the clip 20 are fixed to each other by projection-welding 41.

In either case of the spot-welding 40 or the projection-welding 41, the welding may be conducted before the clip 20 is heat-treated, and then, the clip 20 is heat-treated. This is because if spring steel were welded after the heat-treatment of the clip 20, the spring steel would be tempered due to welding-heat and the spring-elasticity of the spring steel would be lowered. However, since thermal effects due to welding-heat is local in spot-welding 40 and projection-welding 41, the clip 20 may be first heat-treated and then welded to the weight body 10 by spot-welding 40 or by projection-welding 41.

Since the clip 20 is fixed to the weight body 10 by spot-welding 40 or by projection-welding 41, the spring-elasticity is lost only at a portion of the clip 20. In the case where the welding is first conducted and then the clip 20 is heat-treated, the problem of loss of the spring-elasticity in the clip 20 is absolutely removed.

The balance weight for a wheel according to the present invention presents the following technical advantages:

First, since the weight body is made from metal other than lead, the environmental problem existing in the conventional balance weight having a lead weight body is removed. Further, since the clip is provided with a spring-elasticity, the balance weight can be mounted to the wheel of a two-wheel vehicle by inserting the rib of the wheel rim into the clip of the balance weight, so that the mounting of the balance weight to the wheel is easy, and after the mounting, the pair of arms of the clip can hold the rib therebetween due to its spring-elasticity.

Second, in the case where the weight body is made from iron, a sufficient amount of weight can be assured even by a weight body of a relatively small size, so that a weight body with a low cost can be provided.

Third, in the case where the weight body is made from ductile cast iron or cast steel, an effective mass-production of the balance weight is possible, and caulking after casting is also possible.

Fourth, in the case where the weight body and the clip are coupled to each other by caulking, the spring-elasticity of the clip is not lost due to heat.

Fifth, in the case where the weight body and the clip are fixed to each other by a spot-welding or projection-welding, loss of spring-elasticity is local and the remaining portion of the clip can maintain the spring-elasticity.

Sixth, in the case where the outside surface of the groove bottom wall is curved, a good external appearance can be obtained.

The foregoing description of the embodiments of the present invention provides illustration and description, but is not intended to be exhaustive or to limit the invention to the precise form disclosed. Modifications and variations are possible that are consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed is:

1. A balance weight for a wheel of a two-wheel vehicle comprising:

a weight body made from metal other than lead; and a clip made from spring-steel, said weight body having a groove for mounting said clip therein, said weight body including a groove bottom wall and a pair of groove side walls connected to opposite width ends of said groove bottom wall, said clip including a bottom portion and a pair of arms connected to opposite width ends of said bottom portion of said clip, each of said pair of arms including a first, inclining portion extending toward an opposite arm of said pair of arms and in a direction away from said bottom portion of said clip, and a second, rib-holding portion connected to said first portion and located closest to said opposite arm of said pair of arms, said clip being mounted to said groove bottom wall of said weight body with said bottom portion of said clip contacting closely to said groove bottom wall of said weight body, and said clip being fixed to said groove bottom wall of said weight body at said bottom portion of said clip.

2. A balance weight according to claim 1, wherein said weight body is made from iron.

3. A balance weight according to claim 1, wherein said weight body is made from ductile cast iron.

4. A balance weight according to claim 1, wherein said weight body is made from cast steel.

5. A balance weight according to claim 1, wherein said weight body has a protrusion for coupling said clip, at said groove bottom wall of said weight body, and said clip has an aperture formed in said bottom portion of said clip, said clip and said weight body being coupled to each other by inserting said protrusion of said weight body into said aperture of said clip and caulking said protrusion.

6. A balance weight according to claim 1, wherein said clip and said weight body are fixed to each other by spot-welding said bottom portion of said clip and said groove bottom wall of said weight body to each other.

7. A balance weight according to claim 1, wherein said clip and said weight body are fixed to each other by projection-welding said bottom portion of said clip and said groove bottom wall of said weight body to each other.

8. A balance weight according to claim 1, wherein said groove bottom wall of said weight body has an outside surface which is curved in a longitudinal direction of said weight body.

9. A balance weight according to claim 1, wherein said weight body has a U-shaped transverse cross-section.

10. A balance weight according to claim 1, wherein each of said pair of arms also includes a third, guide portion connected to said second portion and extending in a direction away from said opposite arm of said pair of arms and in the direction away from said bottom portion of said clip.

* * * * *